(12) United States Patent
Maeda

(10) Patent No.: US 12,709,333 B2
(45) Date of Patent: Aug. 18, 2026

(54) VEHICLE-BODY FRONT STRUCTURE

(71) Applicant: SUBARU CORPORATION, Tokyo (JP)

(72) Inventor: Akihiro Maeda, Tokyo (JP)

(73) Assignee: Subaru Corporation, Tokyo (JP)

( * ) Notice: Subject to any disclaimer, the term of this patent is extended or adjusted under 35 U.S.C. 154(b) by 289 days.

(21) Appl. No.: 18/519,901

(22) Filed: Nov. 27, 2023

(65) Prior Publication Data

US 2024/0208583 A1 Jun. 27, 2024

(30) Foreign Application Priority Data

Dec. 21, 2022 (JP) ................................ 2022-203813

(51) Int. Cl.
*B62D 25/08* (2006.01)

(52) U.S. Cl.
CPC .................................. *B62D 25/085* (2013.01)

(58) Field of Classification Search
CPC ................................ B62D 25/085; B60K 5/12
See application file for complete search history.

(56) References Cited

U.S. PATENT DOCUMENTS

2013/0043087 A1* 2/2013 Mildner ............... B62D 25/082 180/291
2013/0248275 A1* 9/2013 Cunningham ........... B60K 1/00 180/291
2016/0159399 A1* 6/2016 Yasuhara ............ B62D 25/082 180/292
2019/0126989 A1* 5/2019 Okura .................... B62D 25/08

FOREIGN PATENT DOCUMENTS

JP 2011-152841 A 8/2011

* cited by examiner

*Primary Examiner* — Jason D Shanske
*Assistant Examiner* — Matthew James O'Neill
(74) *Attorney, Agent, or Firm* — McGinn IP Law Group, PLLC

(57) ABSTRACT

A vehicle-body front structure includes a motor unit, main frames, a strut tower reinforcement, a motor support beam, and a support beam bracket. The motor unit drives a vehicle. The main frames are provided on vehicle-widthwise opposite sides and extend in a vehicle front-rear direction. The strut tower reinforcement extends in a vehicle up-down direction on a vehicle front side of a strut tower. The motor support beam is fixed, on its vehicle lower side, with the motor unit. The support beam bracket fixes the motor support beam to the main frames and the strut tower reinforcement. The support beam bracket is fixed to the motor support beam through a first fastening part, is fixed, on its vehicle lower side, to the main frames through a second fastening part, and is fixed, on its vehicle upper side, to the strut tower reinforcement through a third fastening part.

20 Claims, 10 Drawing Sheets

VEHICLE-BODY FRONT STRUCTURE

CROSS-REFERENCE TO RELATED APPLICATIONS

The present application claims priority from Japanese Patent Application No. 2022-203813 filed on Dec. 21, 2022, the entire contents of which are hereby incorporated by reference.

BACKGROUND

The disclosure relates to a vehicle-body front structure.

In general, in a frontal collision of a vehicle, as a measure to reduce injuries to an occupant, it is effective to prevent a deformation of a cabin that is a boarding space for the occupant, and a structure is widely adopted in which collision energy is absorbed in a vehicle-body front structure in front of the cabin.

On the other hand, in a case where the vehicle is a hybrid vehicle, an electric vehicle, or the like, the vehicle-body front structure may accommodate a drive motor unit.

The drive motor unit is supplied with electric power with a high voltage for driving the vehicle. Upon occurrence of the frontal collision or the like of the vehicle, the drive motor unit may cause sudden abnormal reaction when the drive motor unit has any deformation and any broken wire and comes into contact with a vehicle body of the vehicle or a collision object. Consequently, a structure is sought in which an electric unit in a high voltage application state does not interfere with a vehicle body of a vehicle or a collision object.

In response to such a request, for example, Japanese Unexamined Patent Application Publication (JP-A) No. 2011-152841 discloses a technique related to the following vehicle. The vehicle includes a floor panel, a dash panel, a pair of left and right front side frames (main frames), a drive motor, and a battery. The floor panel partitions a vehicle interior space and a space below the vehicle interior space. The dash panel partitions the vehicle interior space and a space in front of the vehicle interior space. The left and right front side frames are disposed to extend in a front-rear direction in front of the dash panel. The drive motor is disposed in a space between the left and right front side frames. The battery supplies electric power to the drive motor. The battery is disposed behind the drive motor such that at least a part of the battery overlaps the drive motor in a front view. The drive motor is disposed to be retracted below the battery upon receiving an impact load of a predetermined magnitude or more from a front side.

SUMMARY

An aspect of the disclosure provides a vehicle-body front structure. The vehicle-body front structure includes a motor unit, main frames, a strut tower reinforcement, a motor support beam, and a support beam bracket. The motor unit is configured to drive a vehicle. The main frames are provided on opposite sides of the vehicle in a vehicle width direction of the vehicle and extend in a vehicle front-rear direction of the vehicle. The strut tower reinforcement extends in a vehicle up-down direction of the vehicle on a vehicle front side of a strut tower that supports a suspension of a front wheel of the vehicle, and reinforces rigidity of the strut tower. The motor support beam has a projected area larger than a projected area of the motor unit in a plan view, and is fixed with the motor unit on a vehicle lower side of the motor support beam. The support beam bracket fixes the motor support beam to the main frames and the strut tower reinforcement. The support beam bracket is fixed to the motor support beam through a first fastening part, is fixed, on a vehicle lower side of the support beam bracket, to the main frames through a second fastening part, and is fixed, on a vehicle upper side of the support beam bracket, to the strut tower reinforcement through a third fastening part.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 4A is a top perspective view of a deformation of the vehicle-body front structure upon occurrence of a vehicle front-side collision in the vehicle-body front structure according to the embodiment of the disclosure, illustrating a state before the collision, and FIGS. 4B and 4C are top perspective views of the deformation of the vehicle-body front structure upon occurrence of the vehicle front-side collision in the vehicle-body front structure according to the embodiment of the disclosure, time-serially illustrating the deformation at the time of a frontal collision;

FIG. 5A is a top perspective view of a deformation of the vehicle-body front structure upon occurrence of a vehicle front-side collision with a utility pole in the vehicle-body front structure according to the embodiment of the disclosure, illustrating a state before the collision, and FIGS. 5B and 5C are top perspective views of the deformation of the vehicle-body front structure upon occurrence of the vehicle front-side collision with the utility pole in the vehicle-body front structure according to the embodiment of the disclosure, time-serially illustrating the deformation at the time of a frontal collision.

DETAILED DESCRIPTION

Figure 1:
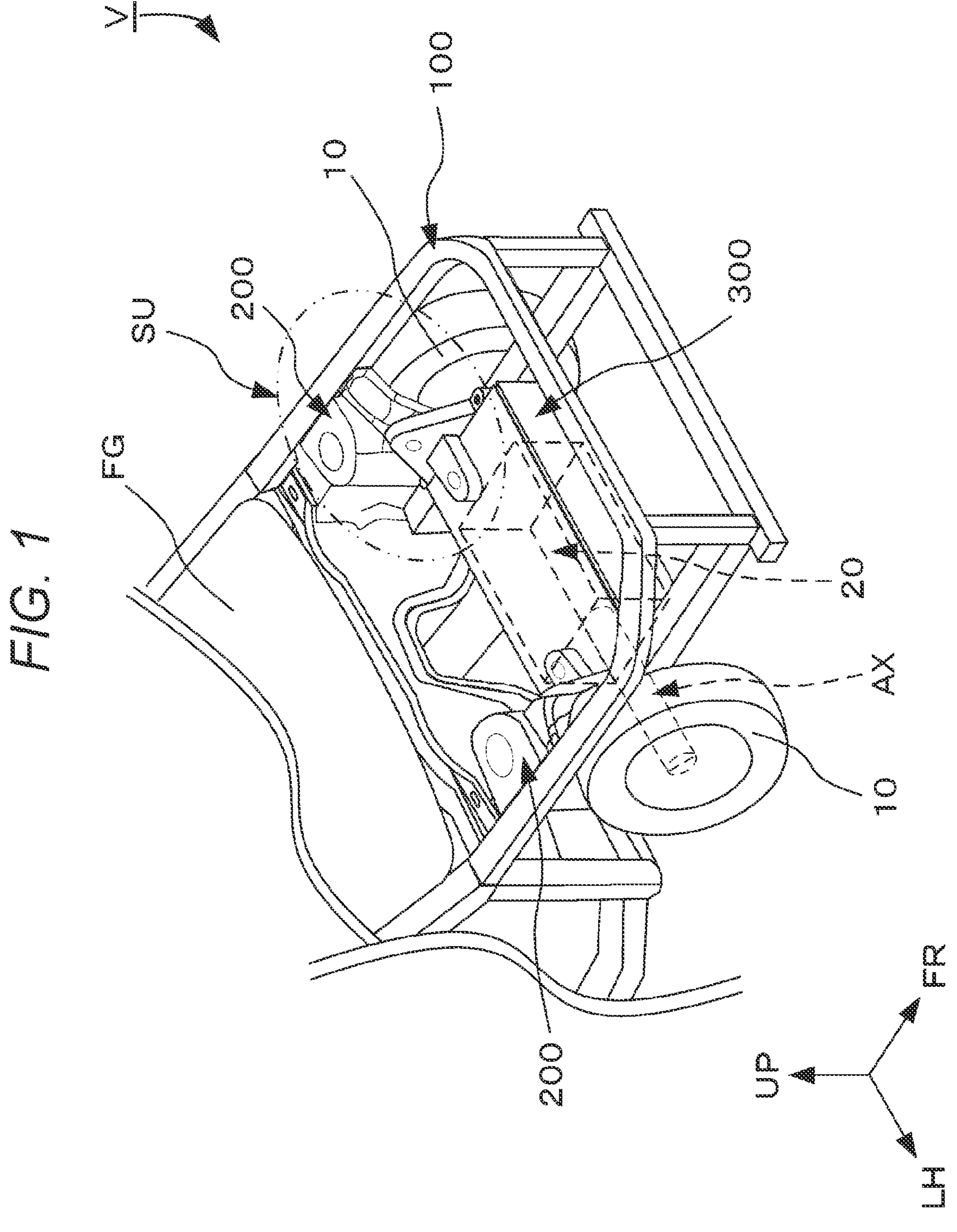
FIG. 1 is a top perspective view of a vehicle-body front part in a vehicle-body front structure according to an embodiment of the disclosure.

The technique described in JP-A No. 2011-152841 has a problem that, for example, when a vehicle frontally collides with the collision object that does not overlap the main frames, such as a utility pole, an electric component being supplied with a high voltage, such as a drive motor, may come into contact with a vehicle body of the vehicle or the collision object because of an impact at the time of a collision.

It is desirable to provide a vehicle-body front structure that protects a drive motor unit upon occurrence of a vehicle front-side collision.

Hereinafter, with reference to FIGS. 1 to 6, a description will be given of a vehicle V to which a vehicle-body front structure S according to the present embodiment is applied. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Note that, arrow FR, arrow UP, and arrow LH, which are illustrated as appropriate in the drawings, point to a front side (front), an upper side in a front view, and a left side in a front view, respectively, of the vehicle illustrated in FIG. 1. Additionally, in the following description, unless otherwise specified, an up-down direction, a front-rear direction, and a left-right direction refer to an up-down direction in a front view, a front-rear direction in a front view, and a left-right direction in a front view, respectively.

EMBODIMENT

Figure 2:
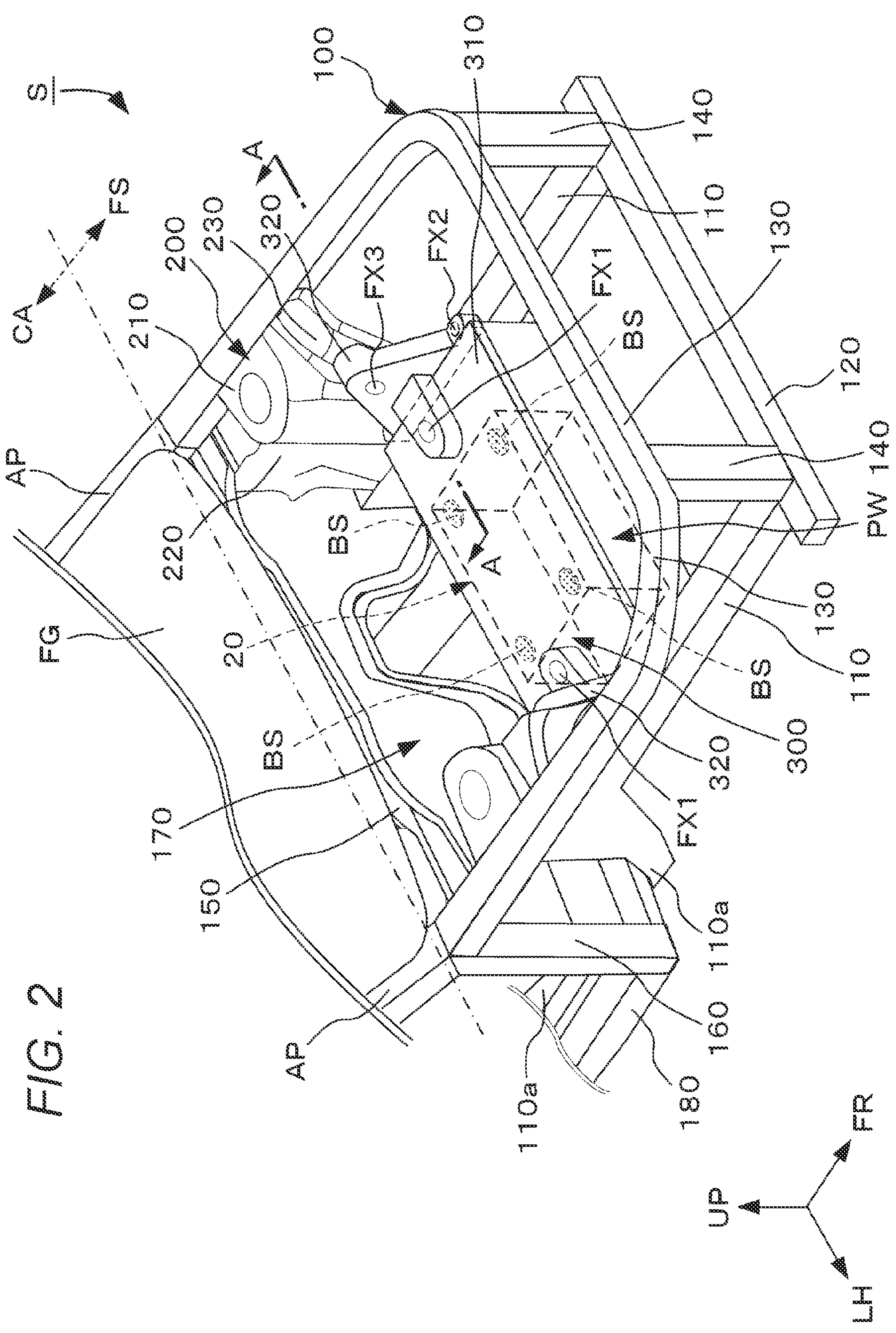
FIG. 2 is a top perspective view of the vehicle-body front part illustrated in FIG. 1 from which front wheels are removed.
Figure 3:
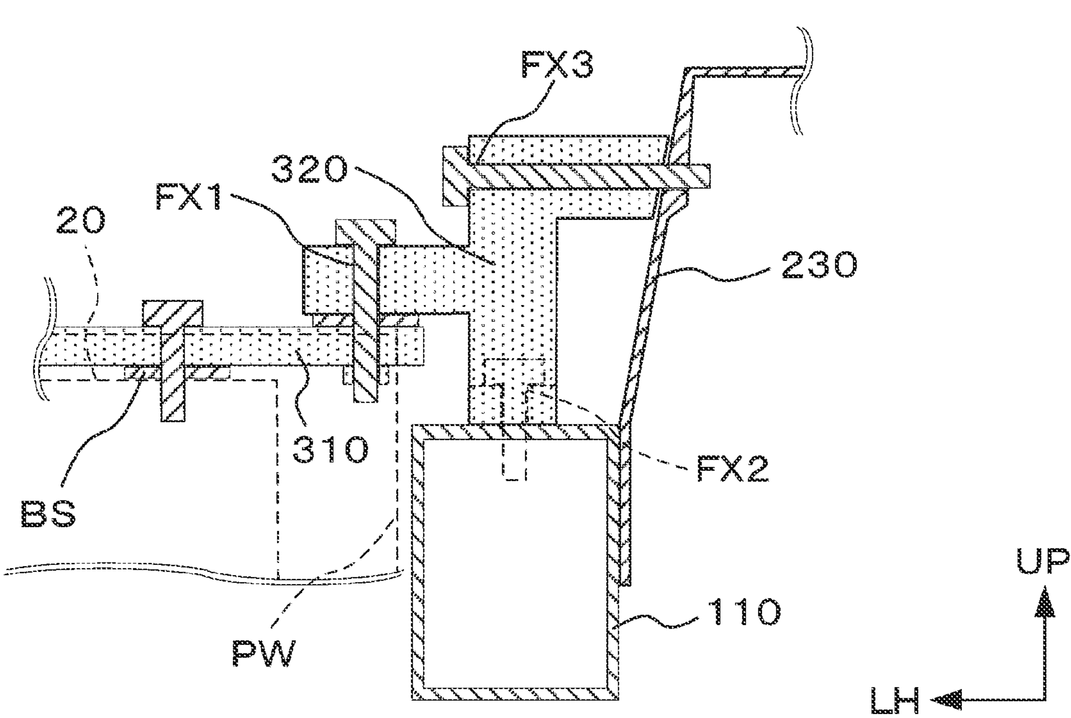
FIG. 3 is an A-directional cross-sectional view of a vehicle up-down directional cross section taken along line A-A illustrated in FIG. 2.

With reference to FIGS. 1 to 3, a description will be given of a configuration of the vehicle-body front structure S, according to the present embodiment, included in the vehicle V.

Configuration of Vehicle V

The vehicle V is, for example, an electric vehicle including, as a drive source, a motor unit 20 serving as a drive motor unit. Note that, the vehicle V may be, for example, a hybrid vehicle including, as drive sources, an engine and the motor unit 20.

Configuration of Vehicle-Body Front Structure S

The vehicle-body front structure S has a bilaterally symmetrical configuration in a vehicle width direction.

As illustrated in FIG. 1, the vehicle-body front structure S includes front wheels 10, the motor unit 20, a front frame 100, strut towers 200, and a motor holder 300. Additionally, a windshield FG is disposed on the vehicle rear upper side of the front frame 100.

The motor unit 20 is a drive motor unit including a motor, a transmission, a clutch, and the like (which are not illustrated) that drive the front wheels 10 fastened to the motor unit 20 by a rotation shaft AX. The motor unit 20 is fixed in a suspended manner to a motor holder 300, which will be described later, while being surrounded by the front frame 100. The motor unit 20 is subjected to a high voltage application during operation of the vehicle V.

Front Frame 100

As illustrated in FIG. 2, the front frame 100 is a framework for maintaining rigidity of a vehicle-body front part FS, and is disposed around the periphery of the vehicle-body front part FS in the vehicle-body front structure S. In the front frame 100, steel materials each formed of a member such as a highly rigid metal and having a closed cross section are provided in each of a vehicle up-down direction and a vehicle front-rear direction, and the steel materials are joined to each other by welding or the like.

The front frame 100 includes main frames 110, a bumper beam 120, an upper frame 130, auxiliary beams 140, a bulkhead front 150, front pillars 160, and a toe board 170.

The main frames 110 are formed of a metal or the like having high rigidity, each have a substantially rectangular closed cross-sectional shape, and are disposed to extend in the vehicle front-rear direction on vehicle-widthwise opposite sides of the vehicle-body front part FS. The bumper beam 120 extending in the vehicle width direction is joined, by welding or the like, to vehicle front-side ends of the main frames 110 disposed on the vehicle-widthwise opposite sides. The toe board 170 to be described later is joined to vehicle rear-side ends of the main frames 110 by welding or the like. Additionally, vehicle lower-side parts of the strut towers 200 are joined, on the vehicle front side of the toe board 170, to vehicle rear-side parts of the main frames 110. Furthermore, each of the main frames 110 is bent to the vehicle lower side of the toe board 170 and further extends toward the vehicle rear side, thereby forming a main frame rear portion 110*a*.

The upper frame 130 is formed of a metal or the like having high rigidity, has a substantially rectangular closed cross-sectional shape, and is disposed on the vehicle upper side with respect to the main frames 110 so as to surround the periphery of the vehicle-body front part FS. The auxiliary beams 140 extending toward the vehicle lower side are joined, on a vehicle lower surface side of the upper frame 130, to a vehicle front-side part of the upper frame 130. The auxiliary beams 140 provide firm joining between the main frames 110 and bumper beam 120 that are disposed on the vehicle lower side thereof and the upper frame 130. The strut towers 200 are each joined to a vehicle rear-side part of the upper frame 130. The strut towers 200 provide firm joining between the main frames 110 disposed on the vehicle lower side and the upper frame 130.

The bulkhead front 150 extends in the vehicle width direction on the vehicle upper front side of the toe board 170, and is joined to the toe board 170 by welding or the like. The windshield FG is disposed on the vehicle rear upper side of the bulkhead front 150. The bulkhead front 150 is formed of a member such as a steel plate, and has a squared U shape with a vehicle lower side opened. Additionally, vehicle-widthwise opposite outer parts of the bulkhead front 150 are joined to the upper frame 130 by welding or the like.

The front pillars 160 are disposed to extend in the vehicle up-down direction on vehicle-widthwise opposite outer sides of the toe board 170. The front pillars 160 are joined to the toe board 170 by welding or the like. Vehicle rear ends of the upper frame 130 and A pillars AP are joined to vehicle upper-side ends of the front pillars 160 by welding or the like. Vehicle front ends of side sills 180 are joined, on rear surface sides of of the front pillars 160, to vehicle lower parts of the front pillars 160 by welding or the like.

The toe board 170 is a partition wall that extends in the vehicle width direction on a vehicle front side of the cabin CA, and that separates the cabin CA from the vehicle-body front part FS in which the motor unit 20 and the like are accommodated. The toe board 170 is provided upright in the vehicle up-down direction on the vehicle front side of the cabin CA, and is joined to the front frame 100 by welding or the like.

Strut Towers 200

The strut towers 200 are each a vehicle-body-side support to which the suspension is to be attached, and are provided at the vehicle-widthwise opposite sides on the vehicle front side of the toe board 170. Each of the strut towers 200 is a framework having a slant from a vehicle upper outer side toward a vehicle lower inner side, and is formed of a metal or the like having high rigidity. The strut towers 200 are joined, on its vehicle upper outer sides, to the upper frame 130. Additionally, the vehicle lower parts of the strut towers 200 are joined to the main frames 110.

Each of the strut towers 200 is constituted by members joined to each other, and includes a top mount 210, a bracket front suspension lower 220, and a strut tower reinforcement 230.

The top mount 210 is formed of a member such as a steel plate having high rigidity and forms a vehicle upper part of the strut tower 200. The top mount 210 has, on its vehicle upper-side surface, a substantially circular through hole that allows a vehicle upper part of the front-wheel suspension to be supported therethrough and that is opened to penetrate the top mount 210 in the vehicle up-down direction. The top mount 210 is joined, on its vehicle-widthwise outer side, to the upper frame 130 by welding or the like.

The bracket front suspension lower 220 is formed of a member such as a steel plate having high rigidity, turns to a vehicle internal-front side from a vehicle-widthwise inner side of the strut tower 200, and extends in the vehicle up-down direction. The bracket front suspension lower 220 is joined, on its vehicle upper side, to the top mount 210 by welding or the like. The bracket front suspension lower 220 is joined, on its vehicle rear side, to the toe board 170 and the bulkhead front 150 by welding or the like.

The strut tower reinforcement 230 is a rigid wall that reinforces a vehicle front-side rigidity of the bracket front suspension lower 220 and extends in the vehicle up-down direction. The strut tower reinforcement 230 is formed of a member such as a steel plate having high rigidity. The strut tower reinforcement 230 is disposed on the vehicle front side of the strut tower 200. The strut tower reinforcement 230 includes a vehicle upper part joined to the top mount 210 and the upper frame 130. The strut tower reinforcement 230 is joined, on its vehicle-widthwise inner side, to the bracket front suspension lower 220 by welding or the like. Additionally, the strut tower reinforcement 230 includes a vehicle lower part joined to the main frame 110. Additionally, the strut tower reinforcement 230 is fixed, on its vehicle-widthwise inner side, with a support beam bracket 320 to be described later.

Motor Holder 300

The motor holder 300 is a beam for fixing the motor unit 20 to the front frame 100 and includes a motor support beam 310 and the support beam brackets 320.

The motor support beam 310 has a projected area larger than that of the motor unit 20 in a plan view, and is fixed, on its vehicle lower side, with the motor unit 20 in a suspended manner.

Bushes BS are provided between the motor support beam 310 and the motor unit 20. The motor support beam 310 is formed of a member such as a steel plate having high rigidity, and is formed into the shape of a substantially rectangular plate whose plate thickness direction corresponds to the vehicle up-down direction and longitudinal direction corresponds to the vehicle width direction. Additionally, the motor support beam 310 is fixed, with bolts or the like, to the support beam bracket 320 at a substantially central part in the vehicle front-rear direction on the vehicle-widthwise outer side of the motor support beam 310.

Furthermore, the motor support beam 310 includes a vehicle front-side edge at which a protective wall PW bent into a substantially L shape is disposed so as to cover the vehicle front side of the motor unit 20.

The support beam brackets 320 are firm fixing components that fix the motor support beam 310 to the main frames 110 and the strut tower reinforcements 230 and that are formed by casting a metal or the like having high hardness. Each of the support beam brackets 320 is fixed to the motor support beam 310 through a fastening part FX1 as a first fastening part. The support beam bracket 320 is fixed, on its vehicle lower side, to the main frame 110 through a fastening part FX2 as a second fastening part. The support beam bracket 320 is fixed, on its vehicle upper side, to the strut tower reinforcement 230 through a fastening part FX3 as a third fastening part. The support beam bracket 320 is formed by casting a metal or the like having high hardness. Additionally, the support beam bracket 320 is formed into a substantially triangular shape having a width widening in the vehicle front-rear direction from the vehicle upper part toward the vehicle lower part when viewed from the vehicle-widthwise inner side, and has a vehicle lower side surface having a flat face in close contact with the vehicle upper-side surface of the main frame 110.

In one example, as illustrated in FIG. 3, the vehicle upper part of the support beam bracket 320 includes the fastening part FX3 protruding outward in the vehicle width direction and has a through hole extending in the vehicle width direction. The support beam bracket 320 includes a vehicle-widthwise outer-side surface shaped to be in close contact with the strut tower reinforcement 230.

Additionally, in the support beam bracket 320, the opposite ends of the vehicle lower part in the vehicle front-rear direction each include the fastening part FX2 protruding in the vehicle front-rear direction and have a through hole extending in the vehicle up-down direction. Then, a vehicle-widthwise inner side surface of the support beam bracket 320 includes the fastening part FX1 protruding inward in the vehicle width direction and has a through hole extending in the vehicle up-down direction.

Additionally, the support beam bracket 320 is firmly fixed to the vehicle-widthwise inner side of the strut tower reinforcement 230 with bolts or the like in the fastening part FX3. Additionally, the support beam bracket 320 is firmly fixed to the vehicle upper surface side of the main frame 110 with bolts or the like in the fastening parts FX2.

Operation and Effects

Figure 4A:
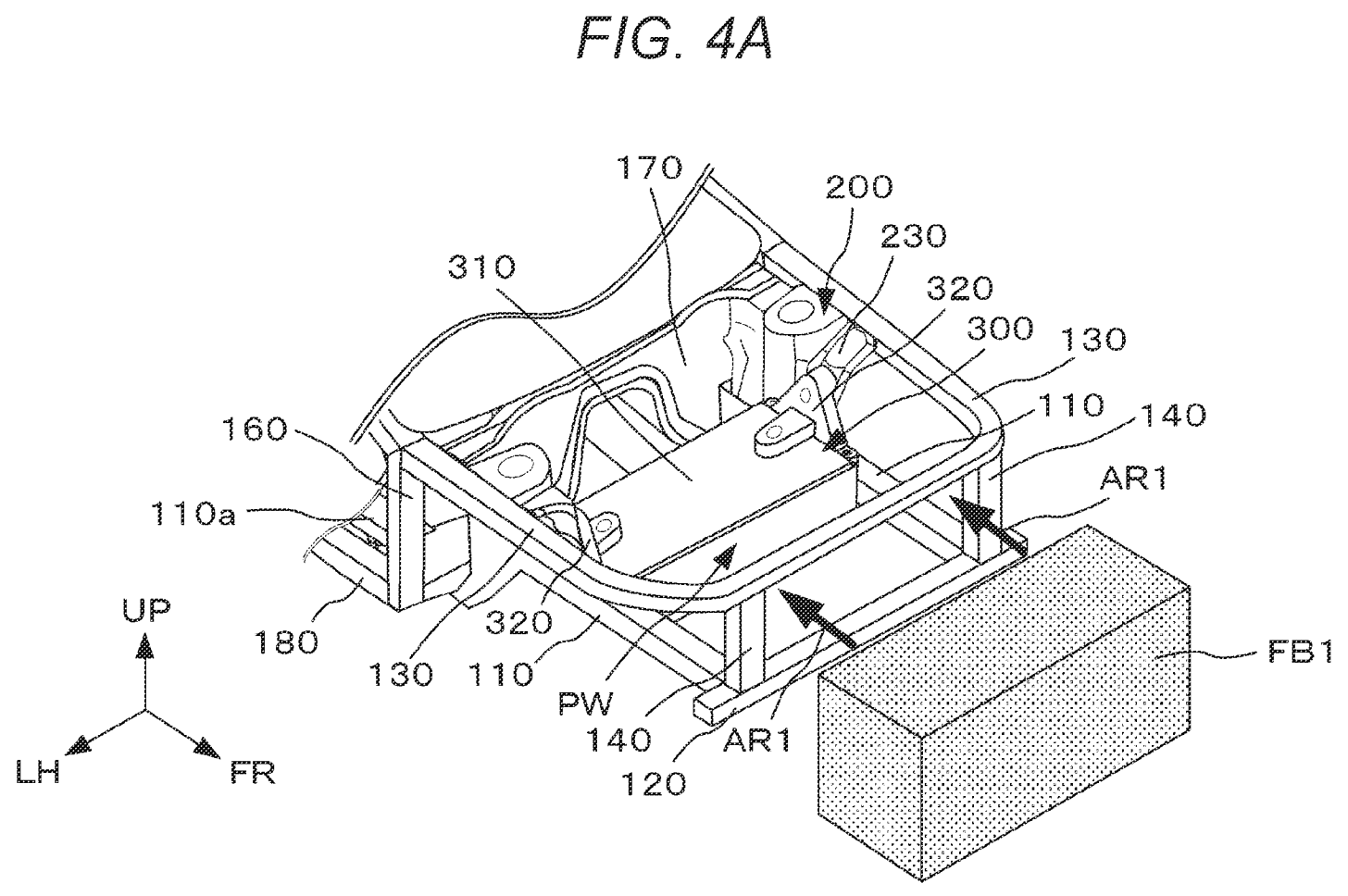

In the vehicle-body front structure S according to the present embodiment with the above configuration, upon occurrence of the vehicle front-side collision, as illustrated in FIG. 4A, a collision object FB1 collides in a direction indicated by arrows AR1. Hereinafter, with reference to FIGS. 4A to 4C, a description will be given of an operation upon occurrence of the vehicle front-side collision with the collision object FB1 as a collision object.

Upon Occurrence of Vehicle Front-Side Collision

Upon occurrence of the vehicle front-side collision, collision energy is transmitted to the main frames 110 and the upper frame 130 via the bumper beam 120 and the vehicle front-side part of the upper frame 130.

Figure 4B:
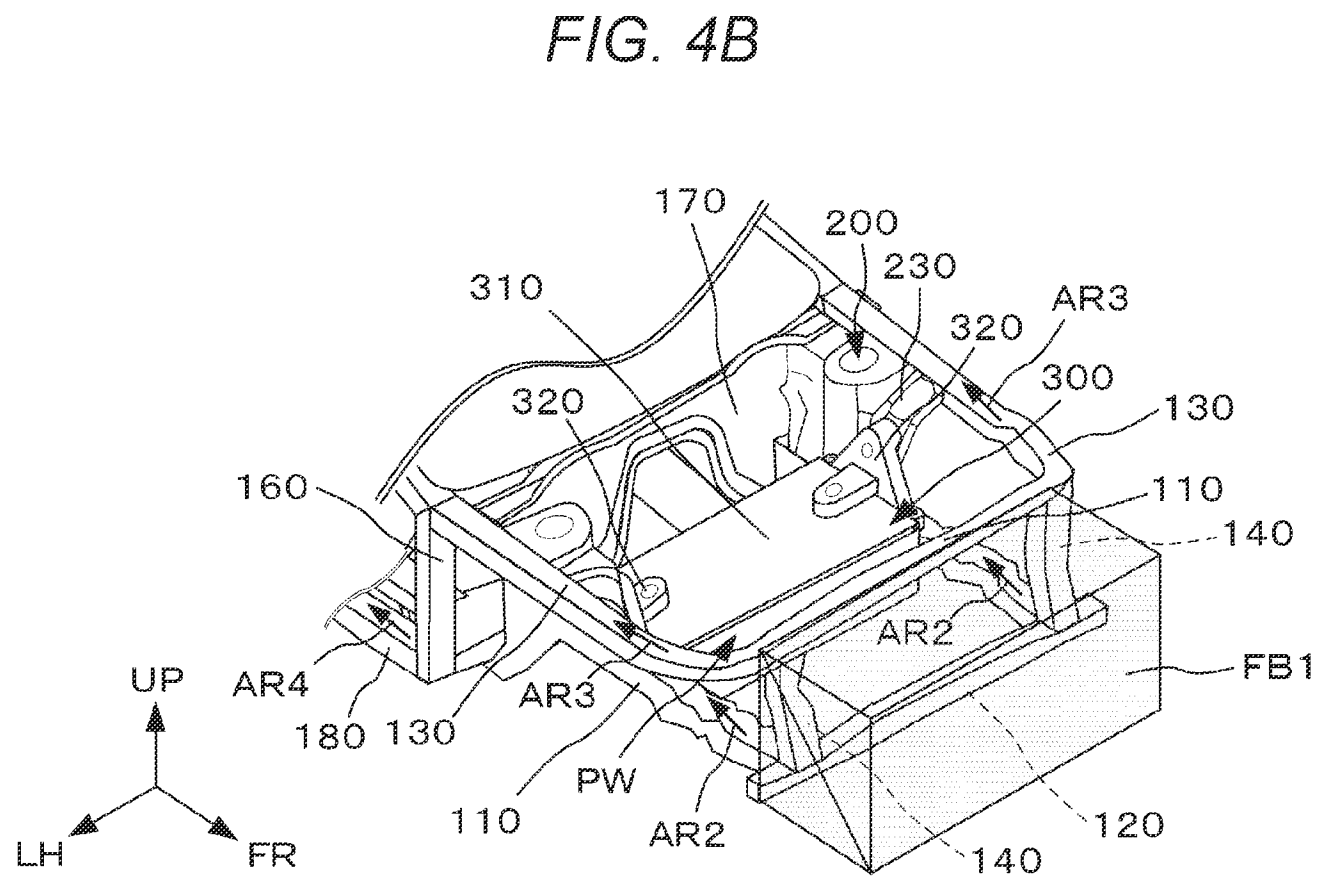

As illustrated in FIG. 4B, the collision energy is transmitted to the main frames 110 in a direction indicated by arrows AR2, and the main frames 110 are crushed by the collision energy. Additionally, the collision energy is transmitted to the upper frame 130 in a direction indicated by arrows AR3, and the upper frame 130 is crushed by the collision energy.

Then, the collision energy is transmitted to the strut towers 200 joined to the vehicle rear-side ends of the main frames 110 and the upper frame 130, the bulkhead front 150, the front pillars 160, the toe board 170, and the main frame rear portions 110*a*.

The collision energy transmitted to the toe board 170 is distributed to a vehicle rear-side frame (not illustrated) via the bulkhead front 150 and the front pillar 160 which are joined to the toe board 170, and the side sills 180 while deforming the toe board 170. The collision energy transmitted to the main frame rear portions 110$a$ is distributed to the vehicle rear-side frame via the main frame rear portions 110$a$ as indicated by arrow AR4.

Furthermore, when the main frames 110 and the upper frame 130 are crushed by the collision energy, the collision energy is absorbed in the main frames 110 and the upper frame 130.

On the other hand, the collision energy transmitted to the strut towers 200 via the main frames 110 and the upper frame 130 moves the motor holder 300 joined to the strut towers 200 toward the vehicle rear side while pushing the strut towers 200 toward the vehicle rear side.

Figure 4C:
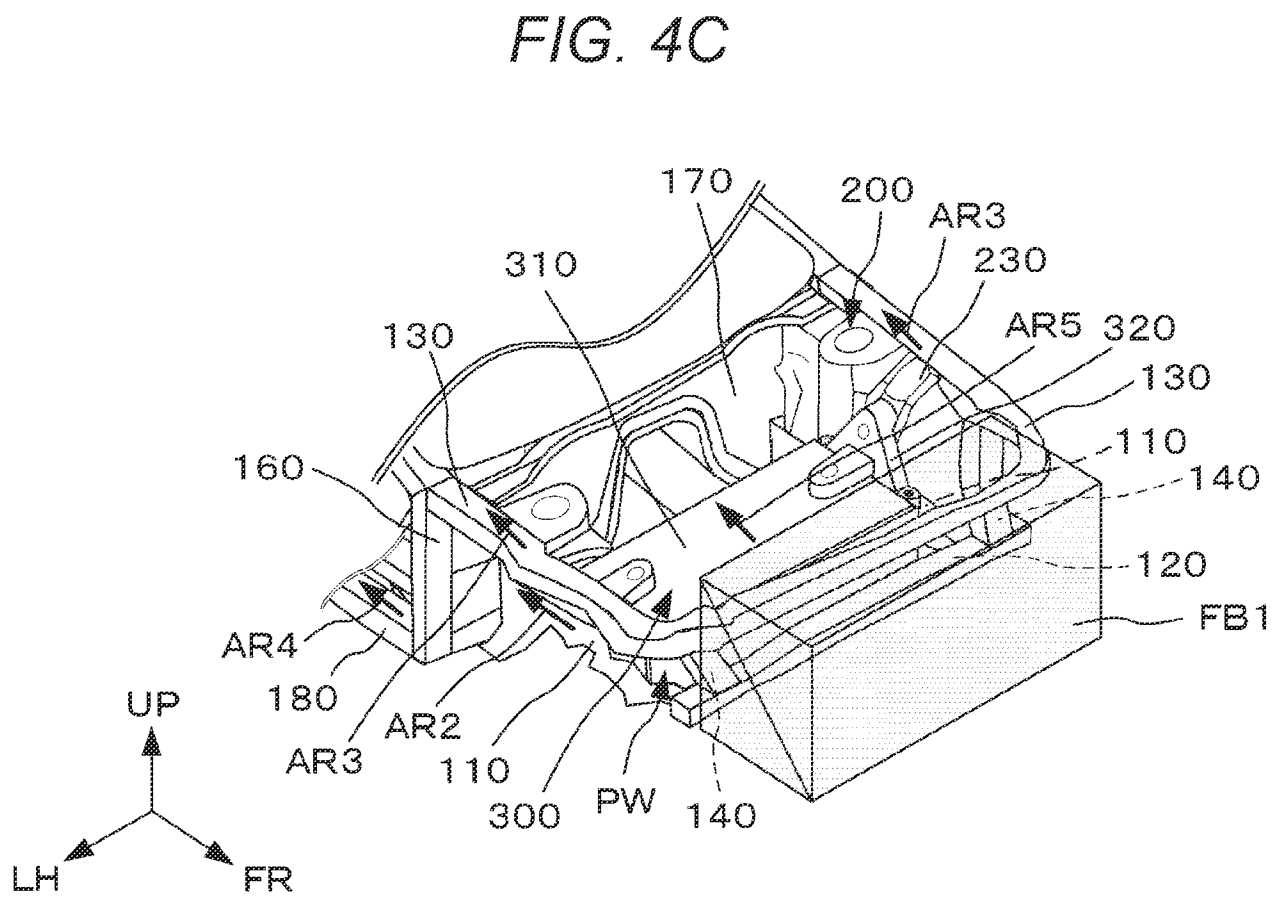

When the collision energy is further transmitted, as illustrated in FIG. 4C, crushing of the main frames 110 and the upper frame 130 progresses. When the main frames 110 and the upper frame 130 are pushed into the vehicle rear side, as indicated by arrows AR3, the main frames 110 and the strut tower reinforcement 230, to both of which the support beam bracket 320 is fixed, also move while deforming toward the vehicle rear side. Then, the motor unit 20 suspended from the motor support beam 310 moves in a direction away from the collision object FB1 along with the movement of the motor support beam 310.

When the collision object FB1 comes into contact with a vehicle front surface side of the motor support beam 310 of the motor holder 300, the collision object FB1 pushes the motor support beam 310 toward the vehicle rear side. At this time, the motor unit 20 moves in a direction away from the collision object FB1 as indicated by arrow AR5 along with the movement of the motor support beam 310 because the motor support beam 310 has a projected area larger than that of the motor unit 20 in a plan view.

Furthermore, the motor support beam 310 includes the vehicle front-side edge at which the protective wall PW bent toward the vehicle lower side into a substantially L shape is disposed so as to cover the vehicle front side of the motor unit 20. The protective wall PW prevents entry of the collision object into the vehicle front side of the motor unit 20 when the vehicle front-side collision occurs and the collision object moves toward the vehicle front-side edge of the motor support beam 310.

As described above, upon occurrence of the vehicle front-side collision, the collision energy is distributed to the firm frameworks that are formed by joining to each other the main frames 110, the bumper beam 120, the upper frame 130, the auxiliary beams 140, the front pillars 160, and the toe board 170 and have a looped and grid shape, and the collision energy is absorbed by means of the deformations of the frameworks.

When the input of the collision energy ends, the collision energy transmission to the main frames 110 and the upper frame 130 ends, and the absorption of the collision energy in the vehicle-body front structure S ends.

Upon Occurrence of Vehicle Front-Side Collision With Utility Pole

Hereinafter, with reference to FIGS. 5A to 5C, a description will be given of an operation upon occurrence of a vehicle front-side collision with a utility pole FB2 as the collision object.

Figure 5A:
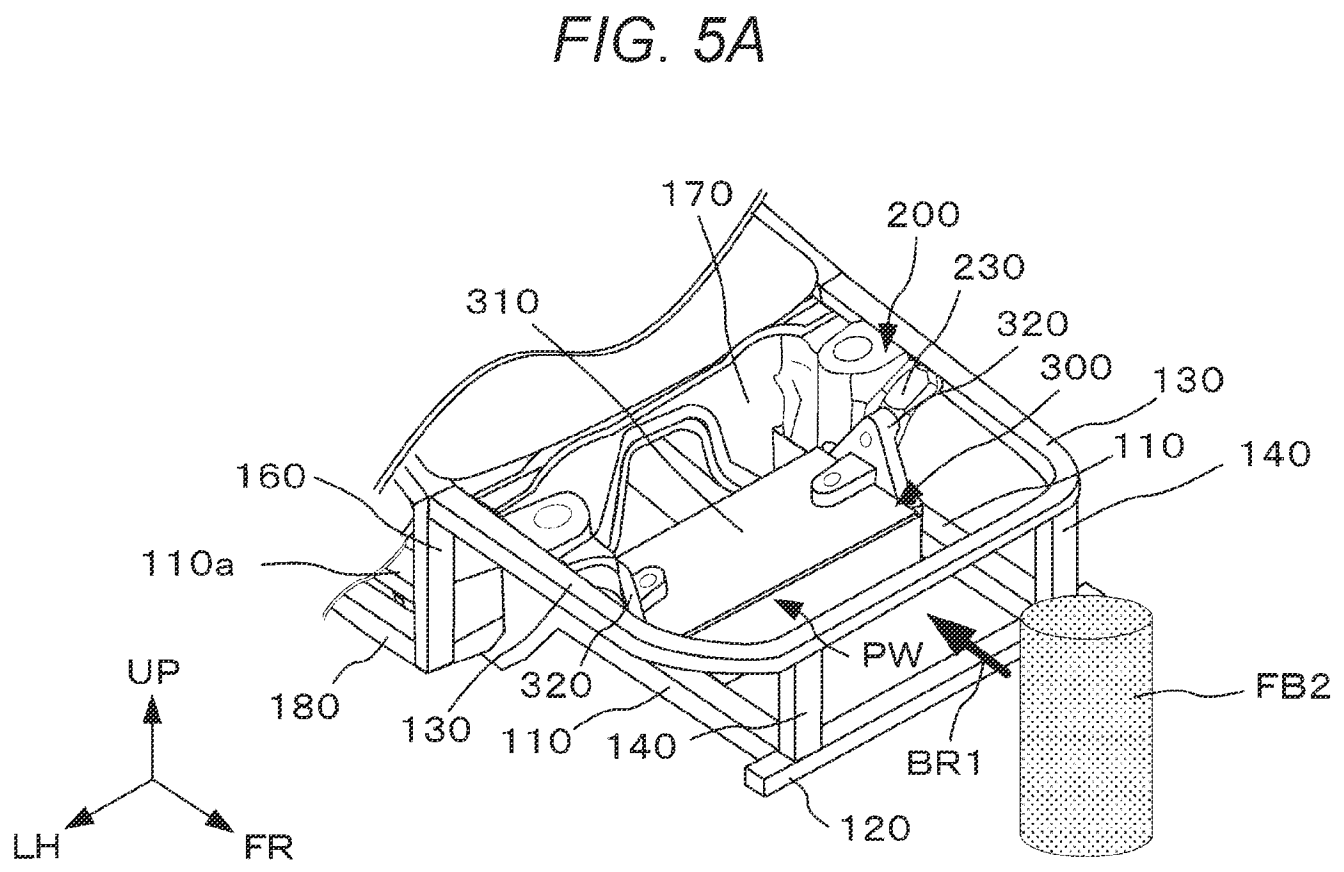

In a case of a collision of the vehicle V with the utility pole FB2, as illustrated in FIG. 5A, collision energy is generated with respect to the vehicle V in a direction indicated by arrow BR1. In the case where the collision object is the utility pole FB2, the utility pole FB2 may enter between the main frames 110 disposed on the vehicle-widthwise opposite sides without overlapping the vehicle front ends of the main frames 110.

Figure 5B:
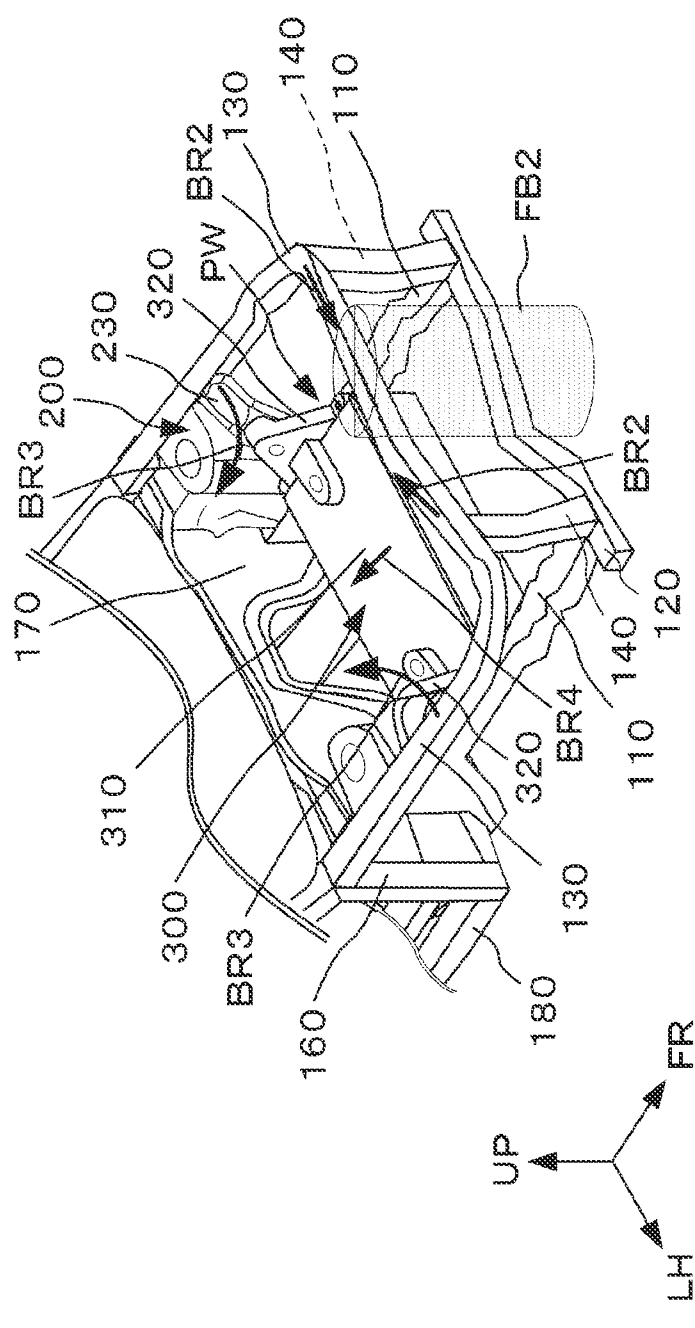

As illustrated in FIG. 5B, the collision energy is transmitted to the bumper beam 120 and the upper frame 130 in a direction indicated by arrows BR2, causing vehicle rearward deformations of the vehicle-widthwise central parts of the vehicle-body front parts of the bumper beam 120 and the upper frame 130. The vehicle-widthwise outer parts of the main frames 110 and the upper frame 130 are pulled from the outer side to the inner side in the vehicle width direction, causing vehicle-widthwise inward deformations of the vehicle-widthwise outer parts of the main frames 110 and upper frame 130. At this time, the main frames 110 and the upper frame 130 are pulled toward the inner side in the vehicle width direction, causing the turns of the strut tower reinforcements 230 in a direction indicated by arrows BR3. Then, vehicle rearward turns of the support beam brackets 320 cause the vehicle rearward movement of the motor support beam 310 as indicated by arrow BR4.

Figure 5C:
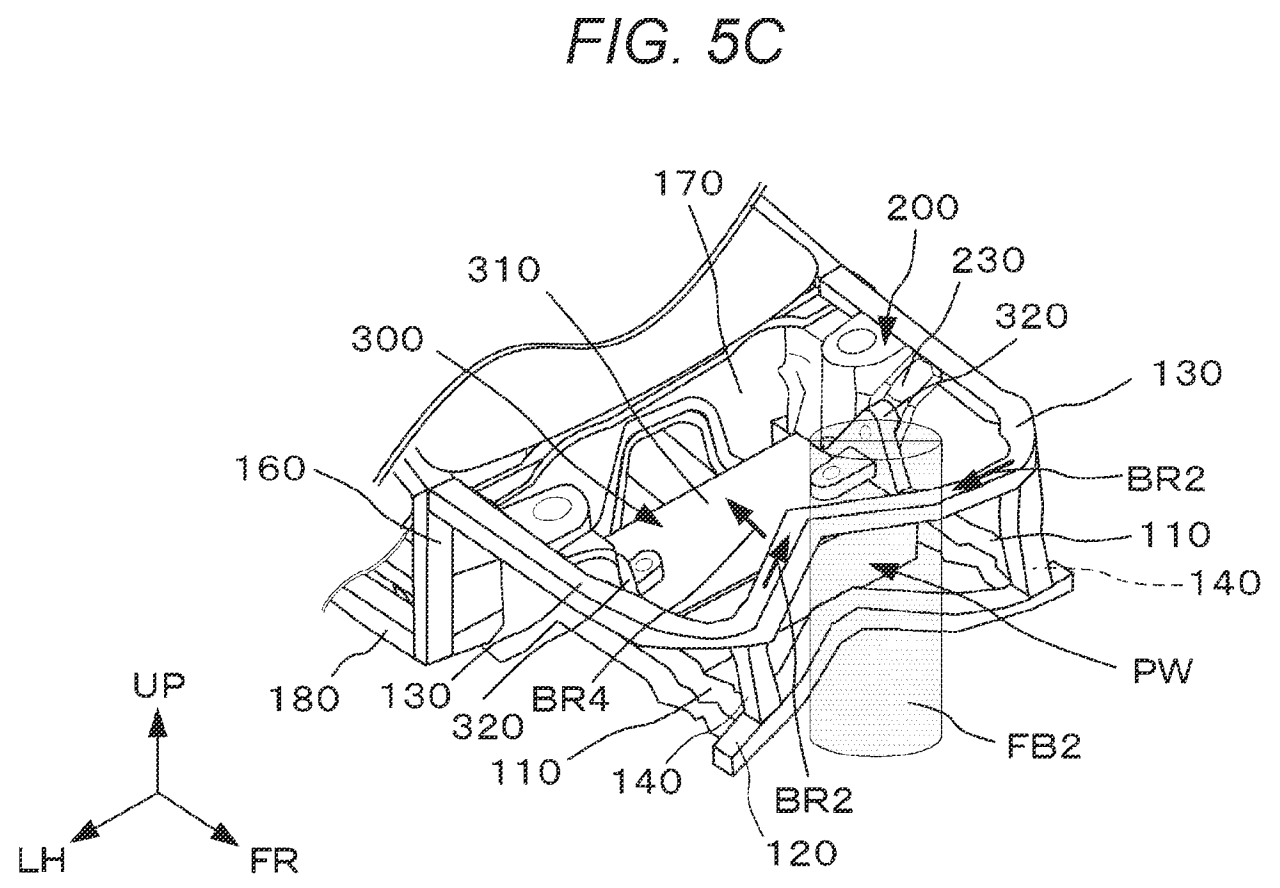

Then, as illustrated in FIG. 5C, the utility pole FB2 makes contact with the vehicle front side of the motor support beam 310. The motor support beam 310 is pushed toward the vehicle rear side by the utility pole FB2, and thus moves toward the vehicle rear side as indicated by arrow BR4 while deforming the support beam brackets 320. The collision energy transmitted from the utility pole FB2 is absorbed by means of deformations of the bumper beam 120, the upper frame 130, and the main frames 110. Furthermore, owing to a pull in the direction of arrows BR2, the collision energy transmitted from the utility pole FB2 is distributed to and absorbed in the frameworks of the front frame 100.

Additionally, the motor unit 20 suspended from the motor support beam 310 moves toward the vehicle rear side together with the motor support beam 310. At this time, the motor unit 20 moves in a direction away from the utility pole FB2 along with the movement of the motor support beam 310 because the motor support beam 310 has the projected area larger than that of the motor unit 20 in a plan view.

Furthermore, the motor support beam 310 includes the vehicle front-side edge at which the protective wall PW bent toward the vehicle lower side into a substantially L shape is disposed so as to cover the vehicle front side of the motor unit 20. The protective wall PW prevents entry of the collision object into the vehicle front side of the motor unit 20 when the vehicle front-side collision occurs and the collision object moves toward the vehicle front-side edge of the motor support beam 310.

As described above, upon occurrence of the vehicle front-side collision, the collision energy is distributed to the firm frameworks that are formed by joining to each other the main frames 110, the bumper beam 120, the upper frame 130, the auxiliary beams 140, the front pillars 160, and the toe board 170 and have the looped and grid shape, and the collision energy is absorbed by means of the deformations of the frameworks. The motor unit 20 suspended from the motor support beam 310 moves toward the vehicle rear side together with the motor support beam 310, and thus moves away from the collision object.

When the input of the collision energy ends, the collision energy transmission to the motor support beam 310 ends, and the absorption of the collision energy in the vehicle-body front structure S ends.

As described above, the vehicle-body front structure S according to the present embodiment includes: the motor unit 20 that drives the vehicle V; the main frames 110 provided on vehicle-widthwise opposite sides and extending in the vehicle front-rear direction; the strut tower reinforcement 230 as the strut tower reinforcement extending in the vehicle up-down direction on the vehicle front side of the strut tower 200 that supports the suspension of the front wheel 10, and reinforcing the rigidity of the strut tower 200; the motor support beam 310 having the projected area larger than that of the motor unit 20 in a plan view and fixed, on its vehicle lower side, with the motor unit 20; and the support beam bracket 320 that fixes the motor support beam 310 to the main frames 110 and the strut tower reinforcement 230. The support beam bracket 320 is fixed to the motor support beam 310 through the fastening part FX1 as the first fastening part. The support beam bracket 320 is fixed, on its vehicle lower side, to the main frame 110 through the fastening part FX2 as the second fastening part. The support beam bracket 320 is fixed, on its vehicle upper side, to the strut tower reinforcement 230 through the fastening part FX3 as the third fastening part.

That is, in the vehicle-body front structure S, the support beam bracket 320, which is the firm fixing component, fixes the motor support beam 310, from which the motor unit 20 is suspended, to the main frames 110 and the strut tower reinforcement 230 forming the frameworks of the vehicle-body front structure S. This can provide the firm frameworks of the vehicle-body front structure S.

On the other hand, upon occurrence of the vehicle front-side collision, the collision energy is distributed to the firm frameworks that are formed by joining to each other the main frames 110, the strut towers 200, and the like and have the looped and grid shape, and can be absorbed by means of the deformations of the frameworks. Additionally, the motor unit 20 suspended from the motor support beam 310 can be moved toward the vehicle rear side together with the motor support beam 310 along with the deformations of the frameworks, and thus can be moved away from the collision object FB1. Even in the case where the collision object is the utility pole FB2, the motor support beam 310 is to be in contact with the utility pole FB2, and the motor unit 20 is moved toward the vehicle rear side. Thus, the motor unit 20 can be moved away from the utility pole FB2 as the collision object.

This can protect the drive motor unit upon occurrence of the vehicle front-side collision.

The vehicle-body front structure S according to the present embodiment further includes the upper frame 130 disposed on the vehicle upper side with respect to the main frames 110 so as to surround the periphery of the vehicle-body front part. The strut tower reinforcement 230 is disposed on the vehicle front side of the strut tower 200. The strut tower reinforcement 230 includes the vehicle upper part joined to the upper frame 130 and includes vehicle lower part joined to the main frames 110.

That is, in the case where the collision object is the utility pole FB2, when the utility pole FB2 enters between the main frames 110 disposed on the vehicle-widthwise opposite sides without overlapping the vehicle front ends of the main frames 110, the vehicle rearward deformations of the vehicle-widthwise central parts of the vehicle-body front parts of the bumper beam 120 and the upper frame 130 cause the vehicle-widthwise inward deformations of the vehicle-widthwise outer parts of the main frames 110 and upper frame 130. At this time, the main frames 110 and the upper frame 130 are pulled inward in the vehicle width direction, causing the vehicle-widthwise inward turns of the strut tower reinforcements 230. The vehicle-widthwise inward turns of the strut tower reinforcements 230 cause the vehicle rearward movement of the motor support beam 310. Then, the motor support beam 310 can move the motor unit 20 away from the utility pole FB2 as the collision object.

This can protect the drive motor unit upon occurrence of the vehicle front-side collision.

In the vehicle-body front structure S according to the present embodiment, the motor support beam 310 includes the vehicle front-side edge at which the protective wall PW bent around the vehicle front side of the motor unit 20 is disposed.

That is, when the vehicle front-side collision occurs and the collision object FB1 or collision object FB2 moves toward the vehicle front-side edge of the motor support beam 310, the protective wall PW disposed at the vehicle front-side edge of the motor support beam 310 so as to cover the vehicle front side of the motor unit 20 can prevent entry of the collision object into the vehicle front side of the motor unit 20.

This can protect the drive motor unit upon occurrence of the vehicle front-side collision.

Note that, as the embodiment of the disclosure, the example has been described that the bushes BS are provided and fixed between the motor unit 20 and the motor support beam 310. Alternatively, a bush may be disposed between the support beam bracket 320 and the main frame 110 or between the support beam bracket 320 and the strut tower reinforcement 230. In this case, upon occurrence of the vehicle front-side collision, it is possible to protect the drive motor unit and further improve vibration resistance and noise resistance during travel of the vehicle V.

Figure 6:
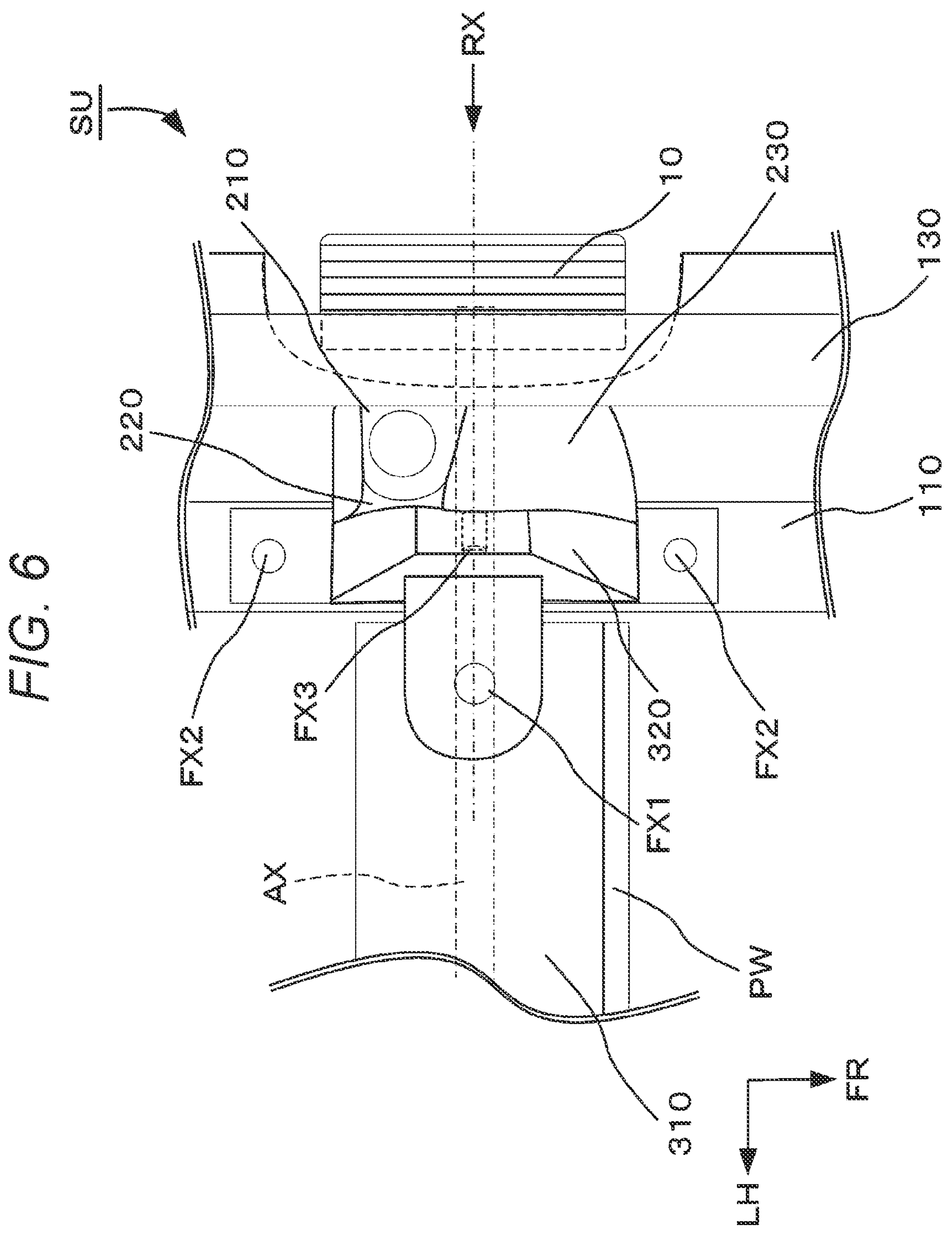
FIG. 6 is a top plan view of an area SU illustrated in FIG. 1 from which a motor unit is removed.

Furthermore, as illustrated in FIG. 6, the fastening part FX1 and the fastening part FX3 in the support beam bracket 320 for fixing the motor support beam 310 may be provided on an axis RX coaxial with the rotation shaft AX for the front wheel 10.

In the motor support beam 310, the motor that drives the front wheel 10 and the rotation shaft AX for the front wheel 10 are disposed on the axis RX in the vehicle up-down direction. Thus, the center of gravity of the weight of the motor unit 20 can be positioned and fixed on the rotation shaft AX for the front wheel 10.

Thus, upon occurrence of the vehicle front-side collision, it is possible to protect the drive motor unit and further improve traveling stability and motion performance during travel of the vehicle V.

Although the embodiment of the disclosure has been described in detail with reference to the drawings, the specific configuration is not limited to the embodiment, and encompasses, for example, design variation within a scope not departing from the gist of the disclosure.

The invention claimed is:

1. A vehicle-body front structure comprising:

a motor unit configured to drive a vehicle;

main frames provided on opposite sides of the vehicle in a vehicle width direction of the vehicle and extending in a vehicle front-rear direction of the vehicle;

a strut tower reinforcement extending in a vehicle up-down direction of the vehicle on a vehicle front side of a strut tower that supports a suspension of a front wheel of the vehicle, and reinforcing rigidity of the strut tower;

a motor support beam having a projected area larger than a projected area of the motor unit in a plan view, the motor support beam being fixed with the motor unit on a vehicle lower side of the motor support beam; and a support beam bracket fixing the motor support beam to the main frames and the strut tower reinforcement, wherein the support beam bracket is fixed to the motor support beam through a first fastening part, is fixed, on a vehicle lower side of the support beam bracket, to the main frames through a second fastening part, and is fixed, on a vehicle upper side of the support beam bracket, to the strut tower reinforcement through a third fastening part, and wherein the support beam is disposed entirely above the main frames.

2. The vehicle-body front structure according to claim 1, further comprising:

an upper frame disposed on a vehicle upper side of the main frames so as to surround a periphery of a vehicle-body front part of the vehicle, wherein the strut tower reinforcement is disposed on the vehicle front side of the strut tower, comprises a vehicle upper part joined to the upper frame, and comprises a vehicle lower part joined to the main frames.

3. The vehicle-body front structure according to claim 1, wherein the motor support beam comprises a vehicle front-side edge at which a protective wall bent around a vehicle front side of the motor unit is disposed.

4. The vehicle-body front structure according to claim 2, wherein the motor support beam comprises a vehicle front-side edge at which a protective wall bent around a vehicle front side of the motor unit is disposed.

5. The vehicle-body front structure according to claim 1, wherein the first fastening part protrudes inward in the vehicle width direction, the second fastening part protrudes in the vehicle front-rear direction, and the third fastening part protrudes outward in the vehicle width direction.

6. The vehicle-body front structure according to claim 1, wherein the support beam bracket includes a vehicle lower side surface in close contact with a vehicle upper side surface of the main frames and a vehicle-widthwise outer side surface in close contact with the strut tower reinforcement.

7. The vehicle-body front structure according to claim 1, wherein, upon occurrence of a vehicle front-side collision with a collision object entering between the main frames, vehicle-widthwise inward deformation of the main frames causes vehicle-widthwise inward turning of the strut tower reinforcement, and the vehicle-widthwise inward turning of the strut tower reinforcement causes vehicle rearward movement of the motor support beam to move the motor unit away from the collision object.

8. The vehicle-body front structure according to claim 1, wherein the first fastening part and the third fastening part are disposed on an axis coaxial with a rotation shaft of the front wheel.

9. The vehicle-body front structure according to claim 1, further comprising a bush disposed between the support beam bracket and the main frames or between the support beam bracket and the strut tower reinforcement.

10. The vehicle-body front structure according to claim 1, wherein the support beam bracket is formed by casting.

11. The vehicle-body front structure according to claim 1, wherein the motor support beam is formed into a shape of a rectangular plate whose plate thickness direction corresponds to the vehicle up-down direction and whose longitudinal direction corresponds to the vehicle width direction.

12. The vehicle-body front structure according to claim 1, wherein the motor unit is fixed in a suspended manner to a vehicle lower side of the motor support beam.

13. The vehicle-body front structure according to claim 1, further comprising bushes provided between the motor support beam and the motor unit.

14. The vehicle-body front structure according to claim 3, wherein the protective wall is bent into a L shape so as to cover the vehicle front side of the motor unit.

15. The vehicle-body front structure according to claim 3, wherein, upon occurrence of a vehicle front-side collision, the protective wall prevents entry of a collision object into the vehicle front side of the motor unit.

16. The vehicle-body front structure according to claim 2, further comprising: a bumper beam extending in the vehicle width direction and joined to vehicle front-side ends of the main frames.

17. The vehicle-body front structure according to claim 16, further comprising: auxiliary beams extending toward a vehicle lower side and joined to a vehicle lower surface side of the upper frame, the auxiliary beams providing joining between the main frames and the bumper beam disposed on the vehicle lower side and the upper frame.

18. The vehicle-body front structure according to claim 1, wherein the main frames each have a rectangular closed cross-sectional shape.

19. A vehicle-body front structure comprising:

a motor unit configured to drive a vehicle;

main frames provided on opposite sides of the vehicle in a vehicle width direction of the vehicle and extending in a vehicle front-rear direction of the vehicle;

a strut tower reinforcement extending in a vehicle up-down direction of the vehicle on a vehicle front side of a strut tower that supports a suspension of a front wheel of the vehicle, and reinforcing rigidity of the strut tower;

a motor support beam having a projected area larger than a projected area of the motor unit in a plan view, the motor support beam being fixed with the motor unit on a vehicle lower side of the motor support beam; and a support beam bracket fixing the motor support beam to the main frames and the strut tower reinforcement, wherein the support beam bracket is fixed to the motor support beam through a first fastening part, is fixed, on a vehicle lower side of the support beam bracket, to the main frames through a second fastening part, and is fixed, on a vehicle upper side of the support beam bracket, to the strut tower reinforcement through a third fastening part, and wherein the support beam bracket has a triangular shape when viewed from a vehicle-widthwise inner side, the support beam bracket having a width widening in a vehicle front-rear direction from a vehicle upper part toward a vehicle lower part.

20. The vehicle-body front structure according to claim 19, wherein the support beam bracket includes a vehicle lower side surface having a flat face in close contact with a vehicle upper side surface of the main frames.

* * * * *